US010244733B1

(12) United States Patent
Lillich

(10) Patent No.: US 10,244,733 B1
(45) Date of Patent: Apr. 2, 2019

(54) ADAPTABLE FENCE EXTENSION ASSEMBLY

(71) Applicant: John G. Lillich, Clatskanie, OR (US)

(72) Inventor: John G. Lillich, Clatskanie, OR (US)

( * ) Notice: Subject to any disclaimer, the term of this patent is extended or adjusted under 35 U.S.C. 154(b) by 445 days.

(21) Appl. No.: 15/062,334

(22) Filed: Mar. 7, 2016

(51) Int. Cl.

| | |
|---|---|
| ***A01K 3/00*** | (2006.01) |
| ***E04H 17/00*** | (2006.01) |
| ***E04H 17/12*** | (2006.01) |
| ***E04H 17/24*** | (2006.01) |
| ***H01B 17/14*** | (2006.01) |

(52) U.S. Cl.
CPC ........... *A01K 3/005* (2013.01); *E04H 17/003* (2013.01); *E04H 17/12* (2013.01); *E04H 17/24* (2013.01); *H01B 17/145* (2013.01)

(58) Field of Classification Search
CPC ....... E04H 17/003; E04H 17/12; E04H 17/24; E04H 2017/006; E04H 17/10; H01B 17/145; A01K 3/005
USPC ........... 256/11, 1, 32, 47, 48, 54; 174/158 F, 174/163 F
See application file for complete search history.

(56) References Cited

U.S. PATENT DOCUMENTS 1,041,848 A * 10/1912 Myers ..................... E21D 11/22 174/158 F
1,237,601 A 8/1917 Arthur
1,401,509 A 12/1921 Bailey
1,664,603 A 4/1928 Farrington
1,743,064 A * 1/1930 Lowndes ................ E04H 17/24 256/11
2,051,302 A 8/1936 Lefforge
2,756,969 A 7/1956 Meinen
2,870,245 A 1/1959 Malme
3,652,780 A 3/1972 Wilson
3,749,368 A * 7/1973 Miller ...................... E04H 17/24 256/11
3,801,731 A 4/1974 Hansen
3,847,489 A 11/1974 Van Riper
4,028,489 A 6/1977 Berg, Jr. et al.
4,049,905 A 9/1977 Maranell
4,065,103 A * 12/1977 Sweezey ............... E04H 17/003 256/11

(Continued)

FOREIGN PATENT DOCUMENTS

DE 29802719 U1 * 4/1998 ............. E04H 17/24
FR 2922723 A1 * 5/2009 ............. A01K 3/005
GB 1323388 A * 7/1973 ............. E04H 17/10

*Primary Examiner* — Matthew R McMahon
(74) *Attorney, Agent, or Firm* — Jerry Haynes Law

(57) ABSTRACT

An adaptable fence extension assembly integrates into a fence having metal T-posts and wooden posts. The assembly fixedly attaches to the termini of the fence posts. The assembly comprises an arc-shaped member that increases the height, depth, and visibility of the fence. The arc-shaped member has an interior channel having a spine that runs along the length of the interior channel. A longitudinal slot and tine enable fastening to the fence posts. When integrated into a metal T post, the longitudinal slot receives a metal T post terminus for fastening thereto. Cleats protruding from the tines, provide slots for the securing of the assembly with wire to a metal t-post. The slots provide a channel for screws and nails when attaching the assembly to wooden post. A concave side of the arc-shaped member includes a U-shaped cavity having an inlet and a narrow cavity terminus for retaining electric cable.

18 Claims, 9 Drawing Sheets

(56) References Cited

U.S. PATENT DOCUMENTS 4,077,611 A 3/1978 Wilson
4,081,177 A * 3/1978 Graff ........ E04H 17/24 256/12
4,159,820 A * 7/1979 Parisien ........ E04H 17/24 256/11
4,263,477 A 4/1981 Wilson, Sr.
4,361,313 A * 11/1982 Russell ........ E01F 13/022 256/13.1
4,599,488 A 7/1986 Wilson, Jr.
4,603,840 A * 8/1986 Simkin ........ E04H 17/24 256/11
4,623,756 A 11/1986 Wilson, Jr.
4,673,166 A * 6/1987 MacDougall ........ E04H 17/02 256/1
4,680,428 A 7/1987 Wilson, Jr.
4,771,137 A * 9/1988 Thompson ........ H01B 17/145 174/163 F
5,085,409 A 2/1992 Teixeira
5,518,333 A 5/1996 Cienkus, Jr. et al.
5,662,313 A * 9/1997 Forrester ........ E04H 17/24 256/11
5,975,501 A * 11/1999 Berg ........ A01K 3/005 174/158 F
6,045,099 A * 4/2000 Aiken ........ A01K 3/005 248/218.4
6,131,885 A * 10/2000 Berg ........ E01F 13/028 174/158 F
6,206,347 B1 * 3/2001 Kelley ........ E04H 17/003 256/1
6,563,055 B1 5/2003 Burdick
6,612,551 B1 * 9/2003 Roy ........ E04H 17/12 256/1
7,216,852 B2 5/2007 Gravelle
7,500,653 B1 * 3/2009 Hartman ........ E04H 17/24 256/1
7,562,453 B1 * 7/2009 Benner ........ A01G 13/10 256/1
7,915,536 B1 3/2011 Hackett
D665,742 S 8/2012 McKinnon
D690,265 S 9/2013 Nelson
8,616,531 B2 * 12/2013 Hough ........ E04H 17/003 256/11
8,646,735 B2 2/2014 Bradley
2008/0308299 A1 * 12/2008 Gallagher ........ A01K 3/005 174/168

* cited by examiner

ADAPTABLE FENCE EXTENSION ASSEMBLY

FIELD OF THE INVENTION

The present invention relates generally to an adaptable fence extension assembly that integrates into different types of fence posts to enhance the enclosure functionality and cable carrying capacity of a fence. More so, the present invention relates to an adaptable fence extension assembly that integrates into a fence by fixedly attaching to a metal T post, a wooden post, or different types of fence posts, and securely carrying a cable, electric wire, or electric tape along the length of the fence, so as to increase the height, depth, and visibility of the fence, and also to increase the capacity of the fence to carry electrical current.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, metal T-posts are often used to support fence such as woven or barbed wire in agricultural applications. In some cases, steel T-posts may be used to support other types of fence, e.g. landscape or privacy fence. Usually, the T-posts are hand-driven into the ground with a weighted steel sleeve, closed on one end and acting as a slide hammer. The result is a low-cost, easily-installed support for fence. Height of a T-post above the ground after being driven into place is typically about 5' in agricultural applications for the control of livestock.

Generally, wood posts are set in the ground to support fencing materials. The posts can be set directly in the ground, or, the part of the post that is below ground may be embedded in concrete. The part of the post that is below ground level, whether embedded in concrete or not, often rots resulting in the supported wood fence falling over requiring that the post be replaced or repaired.

It is recognized that as rural construction on small acreage plots has increased, wild deer and predator wildlife have proliferated due to fewer natural predators and hunting restrictions. These wildlife become emboldened and in many areas are a nuisance, as they eat and otherwise destroy vegetable gardens and plants near residences. Predators and deer can easily jump over the typical agricultural fence.

Often, predation by: dogs, cougars, bobcats, foxes, and raccoons take a heavy toll on livestock, such as: chicken, sheep, cows, and goats. Most attacks occur at night when the owner is likely to be asleep. Typically, it is difficult to trap the predators and dangerous to shoot them, especially on a farm abutting an urban growth boundary.

Also, irresponsible dog owners leave their dogs to run loose. A small pack of dogs is capable of destroying an entire flock of sheep. Just one dog can chase and worry one or more sheep to the point of exhaustion or death. Breeding ewes that are exhausted in such a manner have difficulty lambing for years afterwards. Animal control agencies have become more reluctant to catch and relocate wild predators, such as wolves, coyotes, and cougars.

It is known that wild predators can climb fences as high as 7'. Replacing or retro-fitting existing fences can be both expensive in time and material. Thus, heightening and widening a fence can be a solution. Too make such a repair adaptable to the various types of fences and fence posts can, however, be problematic; especially when trying to maintain sufficient structural integrity to the original fence.

Other proposals have involved fencing systems and extensions thereof. The problem with these systems is that they are not adaptable to attach to different styles of fence posts, and they do not carry electrical cables. Even though the above cited fencing systems meets some of the needs of the market, an adaptable fence extension assembly that integrates into a fence by fixedly attaching to a metal T post, a wooden post, or different types of fence posts, and securely carrying a cable, electric wire, or electric tape along the length of the fence, so as to increase the height, depth, and visibility of the fence, and also to increase the capacity of the fence to carry electrical current is still desired.

SUMMARY

Illustrative embodiments of the disclosure are generally directed to an adaptable fence extension assembly. The adaptable fence extension assembly is configured to integrate into a fence that utilizes metal T-posts, wooden posts, or different types of fence posts. The adaptable fence extension assembly is also configured to carry cables, electric wires, and electrical tape that are associated with fences. In this manner, the height, depth, and visibility of the fence is amplified, and the capacity of the fence to carry electrical current is enhanced.

In one embodiment, the assembly is adaptable so as to fixedly attach to the termini of various types of fence posts while also securely carrying a cable, electric wire, or electric tape along the length of the fence. In one operational embodiment, a plurality of assemblies are aligned along the length of a fence and integrated into spaced-apart fence posts. In this manner, the assembly is effective for increasing the height, depth, visibility, and current carrying capacity of the fence.

In some embodiments, the adaptable fence extension assembly, hereafter, "assembly" comprises an elongated, arc-shaped member that is sized and dimensioned to increase the height, depth, and visibility of the fence. In some embodiments, the arc-shaped member is defined by an interior channel. A spine runs along the length of the interior channel to enhance structural integrity of the arc-shaped member.

In some embodiments, the arc-shaped member may include a longitudinal slot and at least one tine that are used for fastening the arc-shaped member to a metal T post of a fence. When integrated into a metal T post, the longitudinal slot receives the terminus of the metal T post. A fastening wire or zip-tie may be used to tie around the tine and the metal T post terminus for securing the arc-shaped member to the metal T post. Cleats protruding from the tines, provide slots for the securing of the assembly with wire to a metal t-post. The slots provide a channel for screws and nails when attaching the assembly to wooden post. However, the tines are not hammered into the wooden post.

In some embodiments, a panel provides yet another mechanism to enable the arc-shaped member to securely integrate with the wooden post. The panel slidably engages the longitudinal slot in the arc-shaped member. The panel includes at least one aperture that enables passage of fasteners. The fasteners can be used to fasten both the panel and the arc-shaped member directly onto the outer surface of the wooden post.

The arc-shaped member is also configured to snuggly carry cables, electrical wires, or electrical tape along the length of the fence. The cables and electrical wires further enhance the fencing capacity of the fence by elevating the barrier to overcome the fence. The arc-shaped member carries the cables and electrical wires inside at least one U-shaped cavity. The cavity is defined by a wide inlet that tapers into a narrow cavity terminus. The unique configuration of the cavity helps to restrict disengagement of the cable or electric wire from the arc-shaped member.

In some embodiments, the arc-shaped member may be fabricated from an electrically insulated, ultraviolet resistant, and recyclable material. This unique composition helps to controllably maintain electrical discharge only along electrical wires, and prolong the life of the assembly.

In one aspect, the adaptable fence extension assembly, comprises:

an arc-shaped member, the arc-shaped member defined by a top end, a middle section, and a base end, the base end comprising a longitudinal slot, the longitudinal slot disposed along the length of the base end, the arc-shaped member further defined by a concave side and a convex side, the concave side comprising at least one U-shaped cavity, the at least one U-shaped cavity defined by an inlet and a terminus, the terminus configured generally narrower than the inlet, the arc-shaped member further defined by an interior channel, the arc-shaped member configured to at least partially insulate electrical current;

at least one tine, the at least one tine disposed at the base end of the arc-shaped member, the at least one tine defined by at least one notch;

a spine, the spine disposed along the length of the interior channel of the arc-shaped member, the spine configured to enhance the structural integrity of the arc-shaped member; and a panel, the panel configured to detachably slide into the longitudinal slot, the panel defined by at least one aperture and a plurality of ribs, the plurality of ribs configured to enhance the structural integrity of the panel, the plurality of ribs further configured to help guide the panel into the slidable engagement with the longitudinal slot.

In another aspect, the assembly is configured to enable integration with a metal T post or a wooden post of a fence.

In another aspect, the assembly further includes a sleeve, the sleeve configured to join with the base end of the arc-shaped member, the sleeve further configured to receive the wooden post.

In another aspect, the at least one U-shaped cavity is configured to enable reception of a cable, an electric wire, or an electrical tape.

In yet another aspect, the base end of the arc-shaped member comprises an opening.

In yet another aspect, the interior channel extends from the base end to the top end of the arc-shaped member.

In yet another aspect, the spine is defined by a longitudinal portion and a plurality of latitudinal portions.

In yet another aspect, the arc-shaped member is configured from an electrically insulated material.

In yet another aspect, the arc-shaped member is fabricated from a high density polyurethane.

In yet another aspect, the arc-shaped member is fabricated from an ultraviolet resistant material.

In yet another aspect, the at least one tine and the at least one notch are configured to form a generally U-shape.

In yet another aspect, the convex side of the arc-shaped member comprises a plurality of spaced-apart humps.

In yet another aspect, the concave side of the arc-shaped member comprises multiple U-shaped cavities disposed in a spaced-apart configuration.

In yet another aspect, the panel is defined by a narrow central region and two wide end regions.

In yet another aspect, the at least one aperture of the panel comprises four apertures.

In yet another aspect, the at least one aperture of the panel is configured to receive a fastener.

One objective of the present invention is to provide an arc-shaped member that increases the height, depth, and visibility of a fence to protect against predators and unauthorized entry.

Another objective is to provide an arc-shaped member that carries additional cable or electrical wire along the length of a fence.

Another objective is to provide an arc-shaped member that is easy to install on a metal T post or a wooden post.

Another objective is to provide an arc-shaped member that is adaptable to install on different types of fence posts.

Yet another objective is provide an arc-shaped member that is manufactured with a reinforcing spine for enhanced structural integrity.

Yet another objective is to provide an arc-shaped member that is fabricated from a high density polyurethane material.

Yet another objective is to provide an arc-shaped member that insulates against electrical current.

Yet another objective is to provide an arc-shaped member that is manufactured from a recyclable, ultraviolet resistant material.

Yet another objective is to provide an arc-shaped member that is easy and inexpensive to manufacture.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 1A illustrates a predator leaping over a fence, and FIG. 1B illustrates a predator restricted from leaping over an exemplary arc-shaped member, in accordance with an embodiment of the present invention;

FIG. 4A illustrates a frontal view of an arc-shaped member, and FIG. 4B illustrates a side view of an arc-shaped member receiving an exemplary panel, in accordance with an embodiment of the present invention;

FIG. 6A illustrates a front exploded view of the panel, and FIG. 6B illustrates a side view of the panel, in accordance with an embodiment of the present invention;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms: "upper," "lower," "left," "rear," "right," "front," "vertical," "horizontal," and derivatives thereof shall relate to the invention as oriented in FIG. 2. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An adaptable fence extension assembly 100 is referenced in FIGS. 1B-9. The adaptable fence extension assembly 100, hereafter, "assembly 100" is configured to integrate into a fence 200 that utilizes a metal T-post 202*a*, a wooden post 204*a*, or different types of fence posts known in the art. In one embodiment, the assembly 100 is adaptable so as to fixedly attach to the termini 202*b*, 204*b* of various types of fence posts while also securely carrying a cable, electric wire, or electric tape 206 along the length of the fence 200.

Figure 1A:
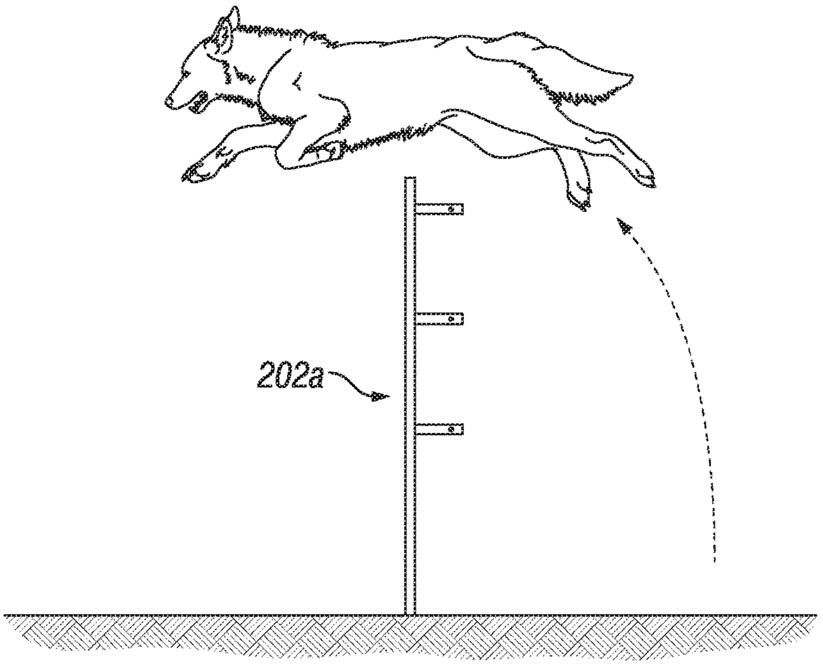
FIGS. 1A and 1B illustrate perspective views of an exemplary adaptable fence extension assembly in use, where
Figure 1B:
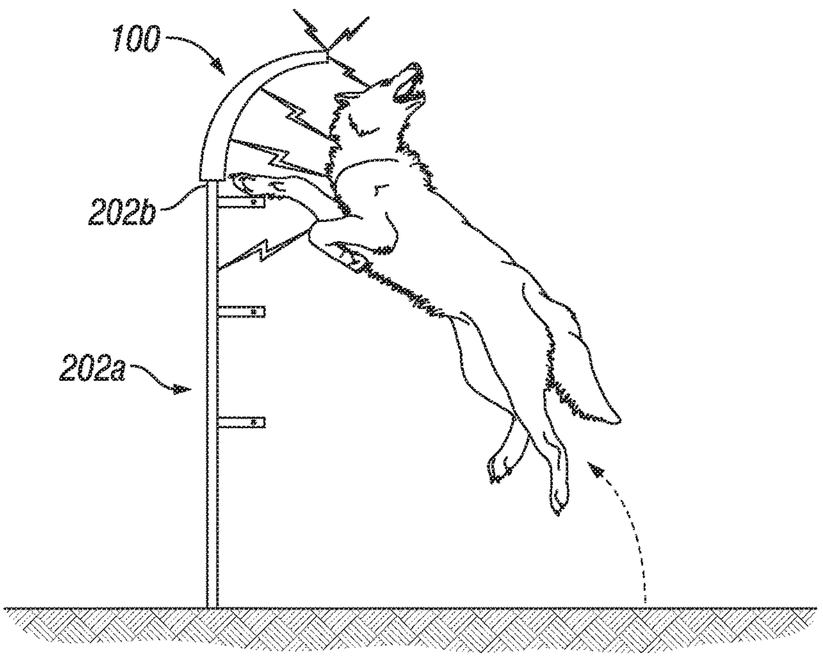

In one operational embodiment, a plurality of assemblies are aligned along the length of a fence 200 and integrated into spaced-apart fence posts 202*a*, 204*a*. In this manner, the assembly 100 is effective for increasing the height, depth, and current carrying capacity of the fence 200. For example, FIG. 1A illustrates a predator leaping over a fence 200. FIG. 1B illustrates the assembly 100 integrated into a fence 200, and inhibiting a predator from leaping over the fence 200. The generally arc shape and elongated configuration of the assembly, and the capacity of the assembly to carry the cable, electric wire, or electric tape 206 along the length of the fence 200, work to inhibit a predator, trespasser, or other unauthorized object from crossing over the fence 200.

As taught in the present invention, the fence 200 may include the type used in a farm, pasture, or field to segregate livestock and crops from predators and trespassers. Though, the assembly 100 may also be integrated into cement walls, barriers, and prefabricated panels. The assembly 100 is also configured to carry cables, electric wires, and electrical tape 206 that are associated with such fences. The fence 200 may include, without limitation, a barbed wire fence 200. The fence post may include a metal T post 202*a* and a wooden post 204*a*. The assembly 100 integrates with a metal T post terminus 202*b* and a wooden post terminus 204*b*. In some embodiments, the wooden post 204*a* may include, without limitation, a: 4×4" post, a 6×6" post, a split post, and a round post. Though in alternative embodiments, the assembly 100 may also integrate into any number of spaced-apart support structures used with fences, gates, windows, and doors.

Figure 2:
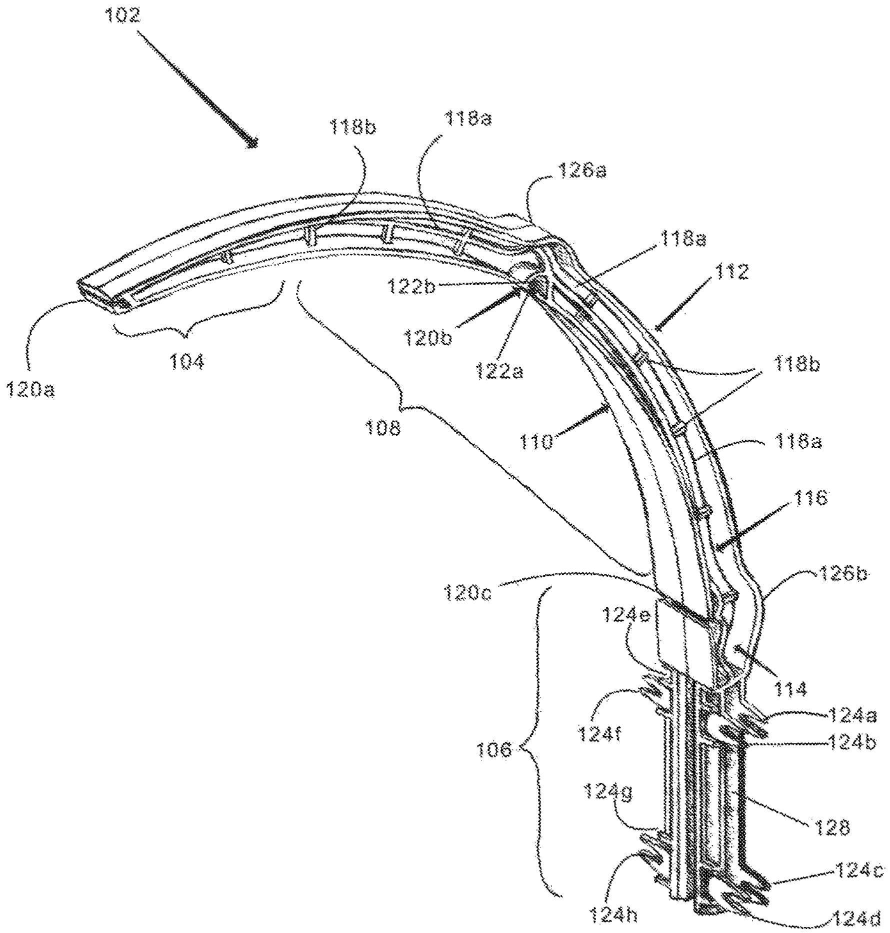
FIG. 2 illustrates a perspective view of an arc-shaped member, in accordance with an embodiment of the present invention.

Looking now at FIG. 2, the assembly 100 comprises an elongated, arc-shaped member 102 that enhances the enclosure functionality of the fence 200 by increasing the height, depth, and visibility of the fence 200. In some embodiments, the arc-shaped member 102 is defined by a top end 104, a middle section 108, and a base end 106. The top end 104 forms the elevated, terminal region of the arc-shaped member 102. The middle section 108 forms a substantial portion of the arc shape, extending between the top end 104 and the base end 106. The base end 106 is configured to attach to the termini 202*b*, 204*b* of the fence posts 202*a*, 204*a*.

Figure 3:
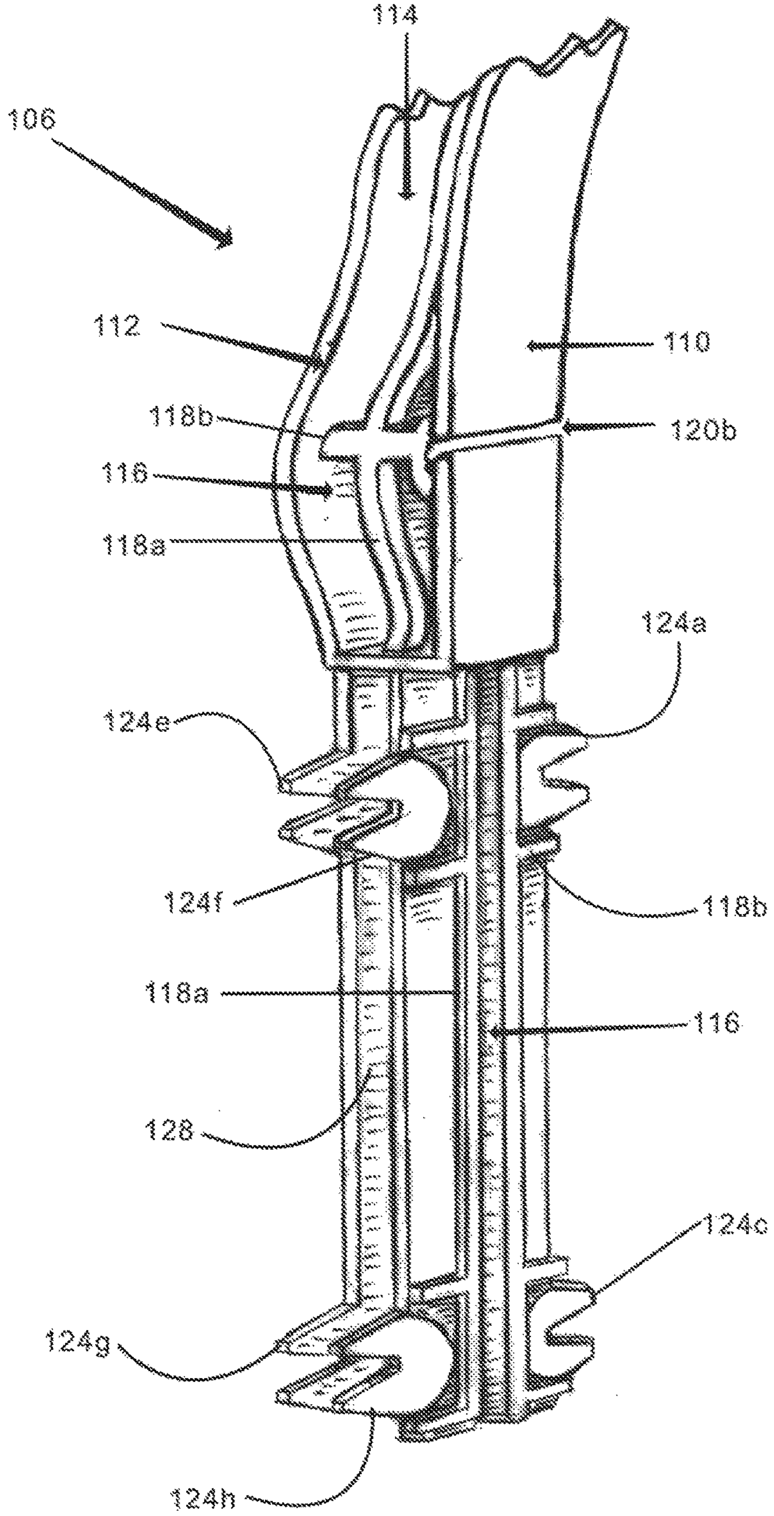
FIG. 3 illustrates a close up view of an exemplary base end of an arc-shaped member, in accordance with an embodiment of the present invention.

Looking now at FIG. 3, the base end 106 of the arc-shaped member 102 comprises multiple fastening components for attaching to the termini 202*b*, 204*b* of the fence posts 202*a*, 204*a*. One of these is a longitudinal slot 128. The longitudinal slot 128 is disposed along the length of the base end 106, running up to the middle section 108 of the arc-shaped member 102. The longitudinal slot 128 is utilized to fasten the arc-shaped member 102 to a metal T post, as described below. Also, the longitudinal slot 128 receives a panel 300 that enables fastening of the arc-shaped member 102 to a wooden post 204*a*. Possible dimensions of the arc-shaped member 102 may be as follows: ¾" thick and 23¾" long from top end 104 to base end 106.

When integrated into a metal T post 202*a*, the longitudinal slot 128 receives the metal T post terminus 202*b*. The longitudinal slot 128 is dimensioned with a width that is sufficient to receive the metal T post terminus 202*b*. A frictional engagement occurs between the metal T post terminus 202*b* and the longitudinal slot 128 to inhibit rotational or axial movement by the arc-shaped member 102. In one embodiment, the longitudinal slot 128 is about ¼" wide.

In an alternative embodiment, the base end 106 may utilize a secondary means for attaching to the wooden post 204*a* through use of an opening that receives the wooden post terminus 204*b*. The opening may also be sized and dimensioned to receive the metal T post terminus 202*b*. In another alternative embodiment, the base end 106 of the arc-shaped member 102 includes a sleeve. The sleeve is configured to receive the steel post 202*a* or a wooden post 204*a* that is 1¼" to 1¾" in diameter.

As FIG. 3 shows, the arc-shaped member 102 is further defined by an interior channel 114. The interior channel 114 follows the general arc shape of the arc-shaped member 102. A spine 116 runs along the length of the interior channel 114 to enhance structural integrity of the arc-shaped member 102. The spine 116 may include a longitudinal portion 118*a* and at least one latitudinal portion 118*b* that further reinforce the spine 116, and thereby the arc-shaped member 102. The longitudinal portion 118*a* and at least one latitudinal portion 118*b* form ribbed protrusions within the interior channel 114. The spine 116 may be fabricated from the same material, i.e., high density polyethylene, as the arc-shaped member 102, or from a more rigid material.

Figure 4A:
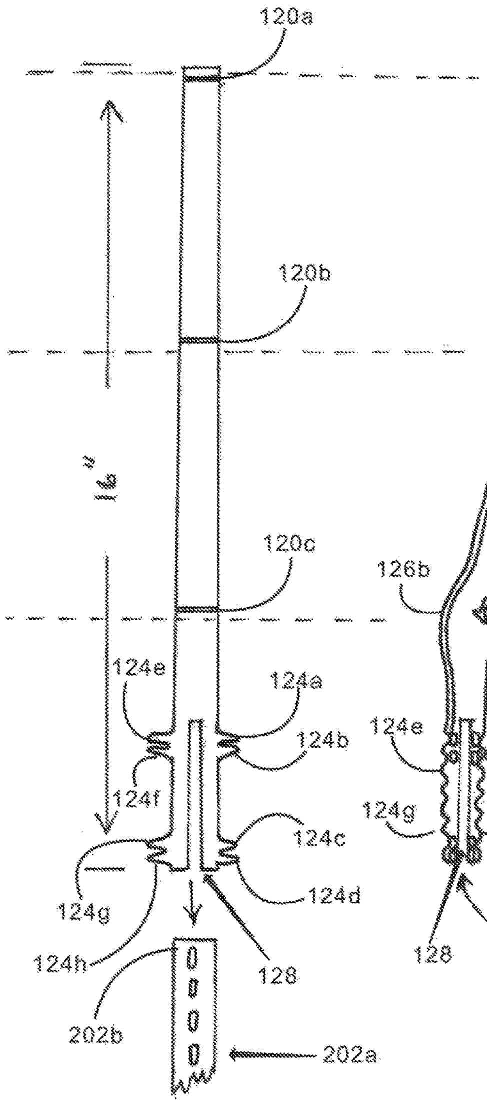
FIGS. 4A and 4B illustrate views of an arc-shaped member joining an exemplary metal T post, where
Figure 4B:
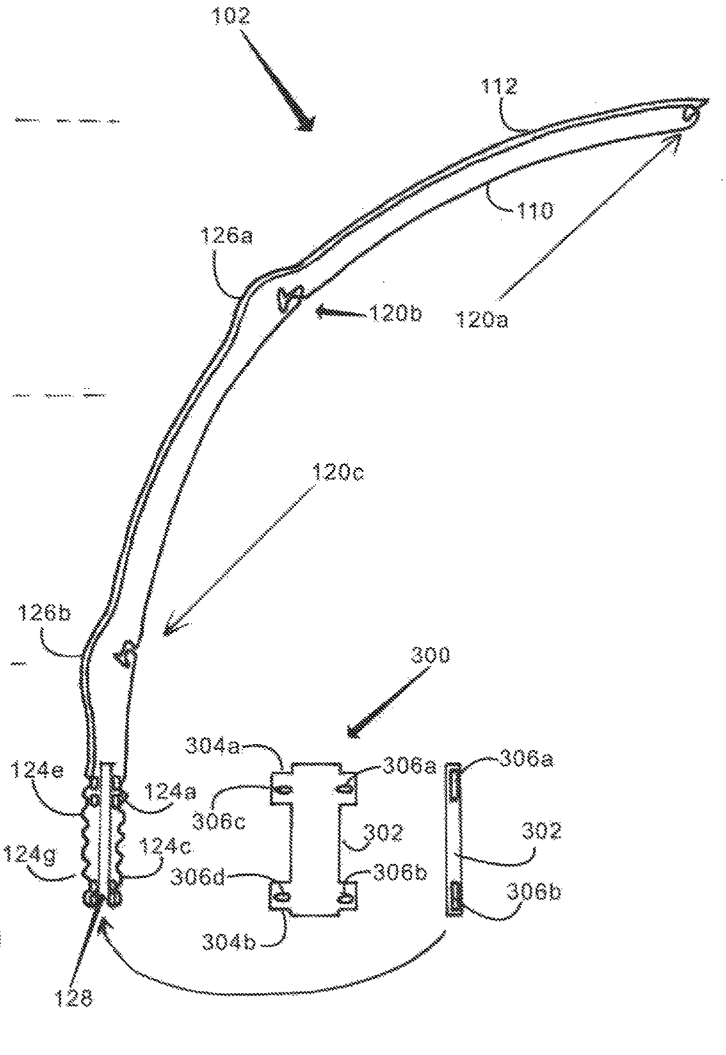

Turning now to FIGS. 4A and 4B, the arc-shaped member 102 is further defined by a convex side 112 and a concave side 110. The convex side 112 of the arc-shaped member 102 comprises a plurality of spaced-apart humps 126*a*, 126*b*. In one embodiment, a first hump 126*a* positions at the top end 104, and a second hump 126*b* positions at the middle section 108 of the arc-shaped member 102.

In some embodiments, the concave side 110 may include at least one U-shaped cavity 120*a*, 120*b*, 120*c*. In one possible embodiment, three U-shaped cavities 120*a-c* are disposed in a spaced-apart relationship along the concave side 110 of the arc-shaped member 102. The cavity 120*a-c*, as described below, carries a cable, electric wire, and electric tape 206 between sequential arc-shaped members, parallel to the fence 200.

As FIG. 2 referenced, the U-shaped cavity 120*a-c* is defined by an inlet 122*a* and a cavity terminus 122*b*. The inlet 122*a* enables passage of the cable, electric wire, and electric tape 206*a-b*. The cavity terminus 122*b* is configured generally narrower than the inlet 122*a*, so as to securely retain the cable, electric wire, and electric tape 206*a-b* within the cavity 120*a-c*. Thus, the arc-shaped member 102 securely carries the cable, electric wire, and electric tape 206*a-b* along the length of the fence 200, often parallel with the cables, such as barbed wire, of the fence 200.

Figure 5:
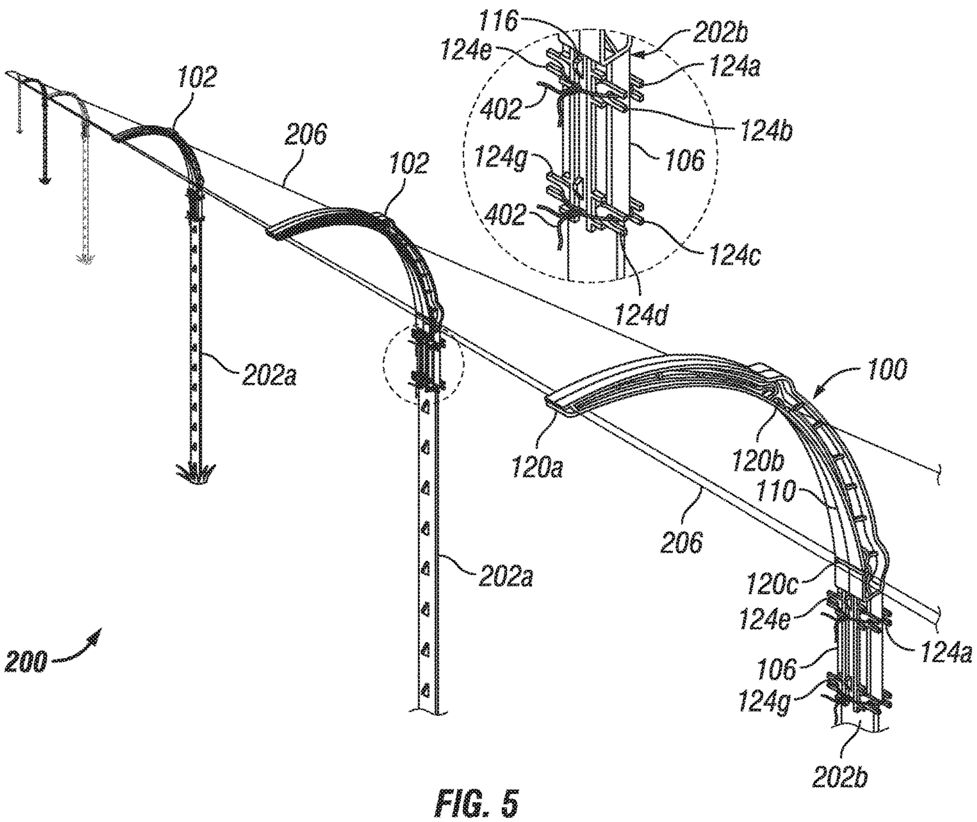
FIG. 5 illustrates an exemplary fence where multiple arc-shaped members integrate into a metal T post, in accordance with an embodiment of the present invention.

Looking now at FIG. 5, the U-shaped cavity 120*a-c* is configured to securely retain a cable, an electrical wire, and an electrical tape 206. In one embodiment, the U-shaped cavity 120*a-c* retains a 17 gauge electrical wire or a ½" wide electrical fencing ribbon. In one alternative embodiment, the U-shaped cavity 120*a-c* may be used to retain a shiny, flashy ribbon that serves to distract large herd animals that have a propensity to damage the fence 200.

In some embodiments, the arc-shaped member 102 may include at least one tine 124*a-h* for fastening the arc-shaped member 102 to a metal T post 202*a* or a wooden post 204*a* of a fence 200. The tine 124*a-h* is disposed at the base end 106 of the arc-shaped member 102. In one embodiment, the tine 124*a-h* forms a pair of sharp points and a notch. In one embodiment, two sharp points and the notch form a generally U-shape. This U-shape enables a fastening wire or zip-tie 402 to tie around the tine 124*a-h* for securing the arc-shaped member 102 to the metal T post 202*a* of the fence 200. In this configuration, the metal T post terminus 202*b* slides into the longitudinal slot 128, and the fastening cable 402 ties around the tine 124*a* and the metal T post terminus 202*b*.

Also, cleats protruding from the tines 124*a-h*, provide slots for the securing of the assembly with wire to a metal t-post 202*a*. The slots provide a channel for screws and nails when attaching the assembly to wooden post. However, the tine 124*a-h* is not designed to be hammered into wood.

In some embodiments, a panel 300 provides yet another mechanism to enable the arc-shaped member 102 to securely integrate with the wooden post 204*a*. The panel 300 slidably engages the longitudinal slot 128 in the base end 106 of the arc-shaped member 102 to fasten both the panel 300 and the arc-shaped member 102 directly into the wooden post 204*a*.

Figure 6A:
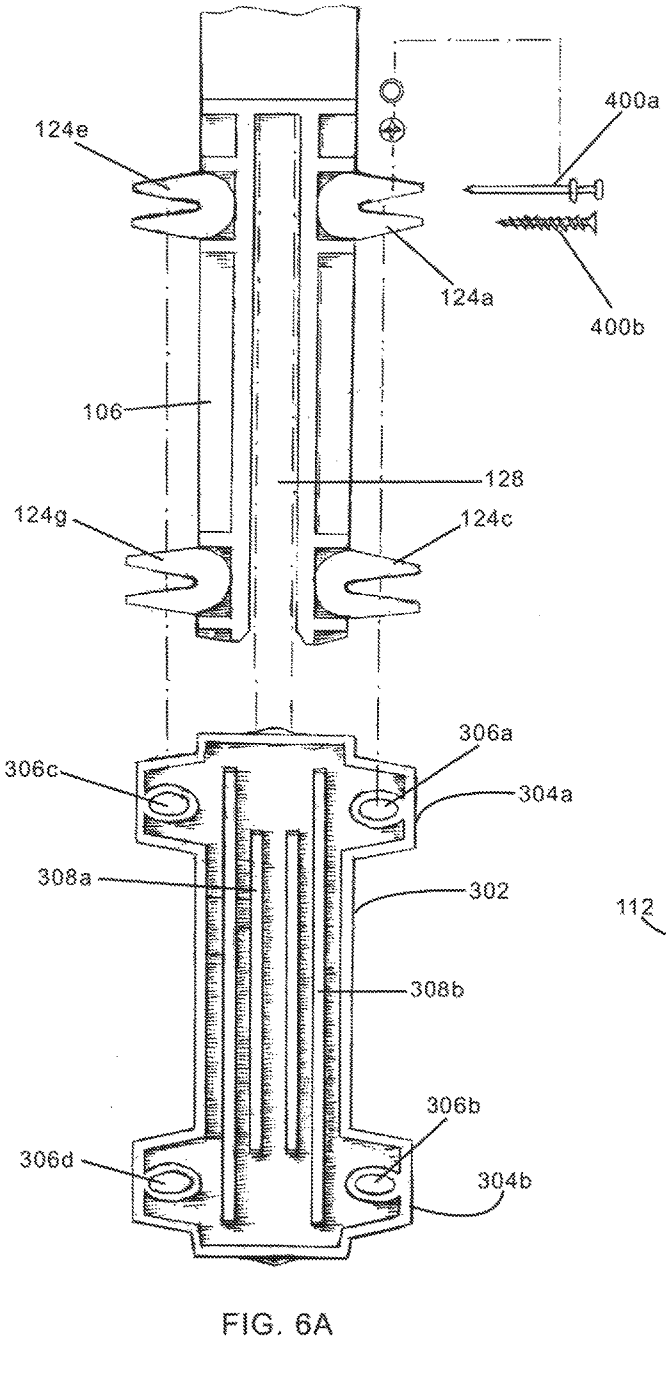
FIGS. 6A and 6B illustrate views of a panel, where

As illustrated in FIG. 6A, the panel 300 comprises at least one aperture 306*a-d* that enables passage of fasteners 400*a*, 400*b* into the wooden post to secure the arc-shaped member 102 to the wooden post. The panel further includes a plurality of ribs 308*a*, 308*b* that enhance the structural integrity of the panel 300. The ribs may be disposed longitudinally along the panel 300.

Figure 6B:
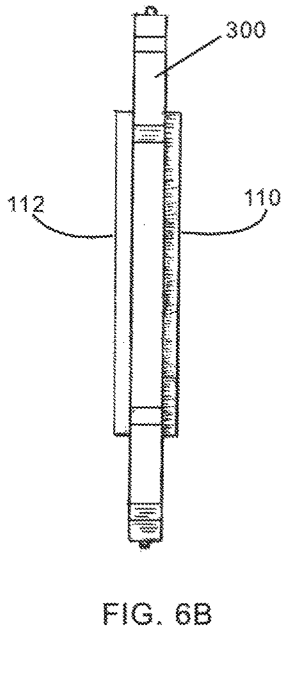

In some embodiments, the at least one aperture 306*a-d* of the panel 300 comprises four apertures 306*a-ds*. In one embodiment, the panel 300 has a narrow central region 302 and two wide end regions 304*a-b*. The four apertures 306*a-ds* may position at the corners of the two wide end regions 304*a-b*. The apertures 306*a-d* are configured to receive a fastener 400*a*, 400*b* such as a screw or nail. As FIG. 6B shows, the panel 300 is sized and dimensioned to fit inside the longitudinal slot 128 of the base end 106 of the arc-shaped member 102.

Figure 7:
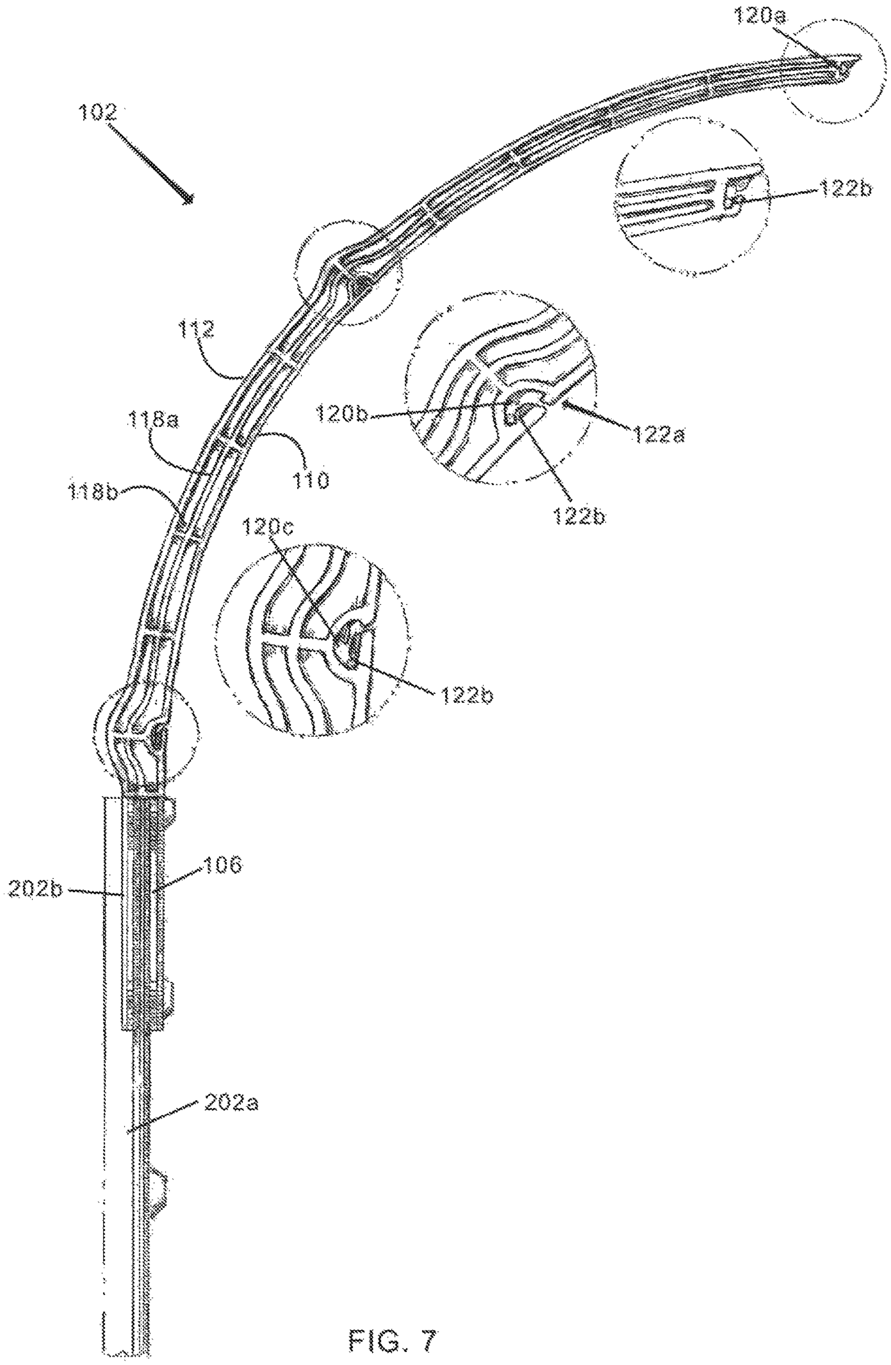
FIG. 7 illustrates a side view of an arc-shaped member integrated with a metal T post, in accordance with an embodiment of the present invention.
Figure 8:
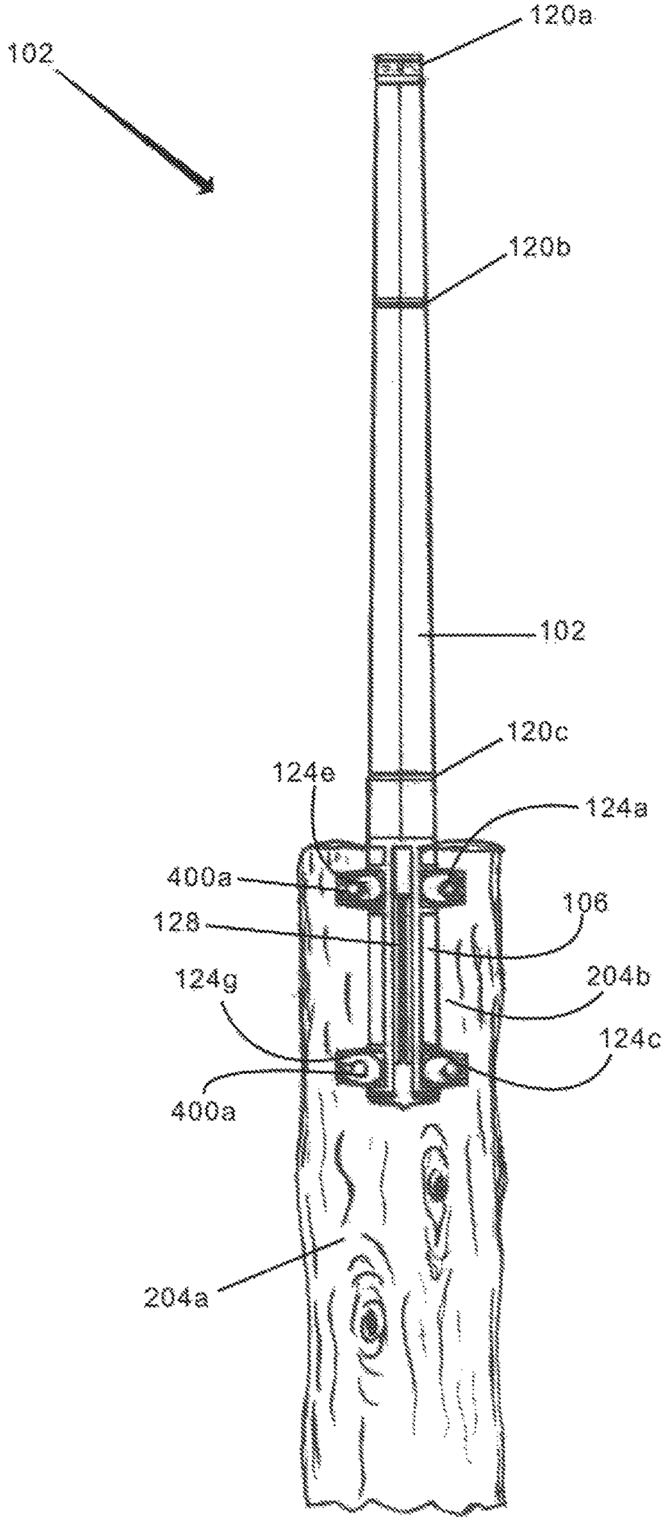
FIG. 8 illustrates a frontal view of an arc-shaped member positioned with fasteners on a terminus of a wooden post, in accordance with an embodiment of the present invention.

As referenced in the close up view of FIG. 7, the U-shaped cavity 120*a-c* along the concave side 110 of the arc-shaped member 102 is configured to enable secure retention of cables, electrical wires, or electrical tape 206. Thus, when a series of arc-shaped members are used, the cables, electrical wires, or electrical tape 206 may be extended along the length of the fence 200. The cables, electrical wires, or electrical tape 206 further enhance the fencing capacity of the fence 200 by elevating the barrier to overcome the fence 200.

The cavity 120*a-c* is defined by an approximately 3/32 inch wide inlet 122*a* that tapers into a narrow terminus 122*b* that helps to restrict disengagement of the cables, electrical wires, or electrical tape 206 from the arc-shaped member 102. In some embodiments, the narrow terminus 122*b* may be defined by a vortex shape, a zig-zag shape, or any irregular shape.

Figure 9:
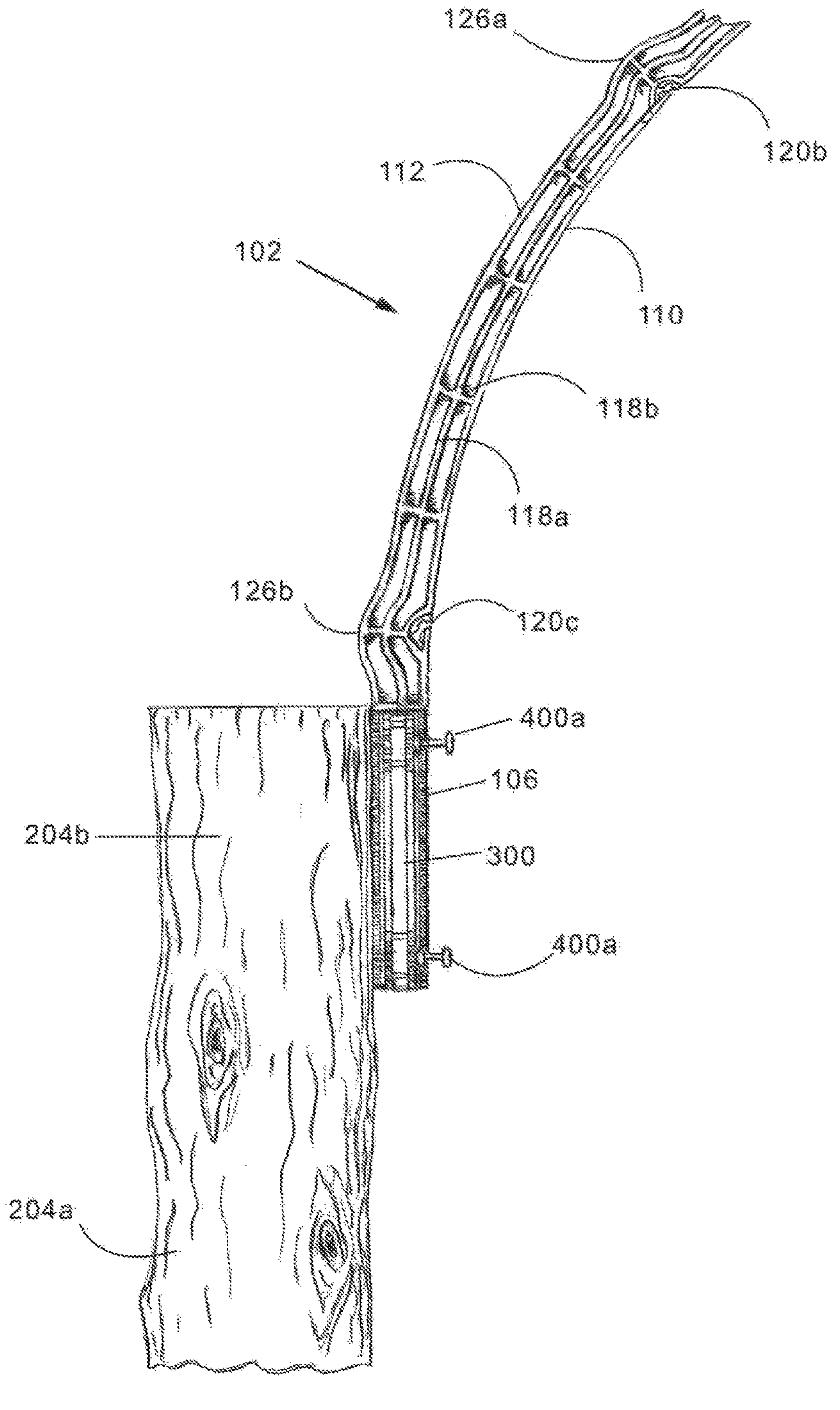
FIG. 9 illustrates a side view of an arc-shaped member and a panel fastening to the outside of a terminus of a wooden post, in accordance with an embodiment of the present invention.

As FIG. 9 illustrates, the panel 300 provides a mechanism to enable the arc-shaped member 102 to securely integrate with the wooden post 204*a*. The panel 300 slidably engages the longitudinal slot 128 in the arc-shaped member 102 and fastens both the panel 300 and the arc-shaped member 102 directly onto the wooden post 204*a*. The panel 300 comprises at least one aperture 306*a-d* that enables passage of the fastener 400*a-b* into the wooden post 204*a* to secure the arc-shaped member 102 to the wooden post 204*a*.

In some embodiments, the arc-shaped member 102 may be fabricated from an electrically insulated, ultraviolet resistant material. This unique composition helps to controllably maintain electrical discharge only along the electrical wires, and prolongs the life of the arc-shaped member 102. Suitable materials for the arc-shaped member 102 may include, without limitation, high density polyethylene, polyurethane, steel, metal alloys, and a rigid polymer.

It must be noted that the shape, material, color, size, and function of the assembly 100 is not limited to those that comprise the embodiments as described above. As an example, a color could be green to match a landscape, or camouflage to blend in, or red to serve as a warning that clashes with the landscape. An embodiment could be manufactured without: the spine 116, the at least one tine 124*a-h*, the longitudinal slot 128, the panel 300, or the sleeve as a means for creating a sleeker assembly from which to hang a wind ornament or birdhouse. A series of two identical embodiments with their base end 106 screwed to the side of a wooden frame, having their tips screwed together at the top end 104 would create an arched framework. Larger versions, as described above, but instead bolted and/or welded in place might perform as structural roof supports. A larger embodiment mounted in series might be adapted for use as over-reaching supportive rafters, ideal for open-sided structures such as: bus stops, market stalls, ticket booths, and sound stages.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An adaptable fence extension assembly, the assembly comprising:

an arc-shaped member, the arc-shaped member defined by a top end, a middle section, and a base end, the base end comprising a longitudinal slot, the longitudinal slot disposed along the length of the base end, the top end and the middle section of the arc-shaped member having a continuous longitudinal curvature, the arc-shaped member further defined by a concave side inside the curvature and coextensive with the top end and the middle section and a convex side outside the curvature and coextensive with the top end and the middle section, the concave side comprising at least one U-shaped cavity, the at least one U-shaped cavity defined by an inlet and a cavity terminus, the cavity terminus configured generally narrower than the inlet, the arc-shaped member further defined by an interior channel, the interior channel longitudinally curved along its length, the arc-shaped member configured to at least partially insulate electrical current;

at least one tine, the at least one tine disposed at the base end of the arc-shaped member, the at least one tine defined by at least one notch; and a spine, the spine disposed along the length of the interior channel of the arc-shaped member, the spine configured to enhance the structural integrity of the arc-shaped member.

2. The assembly of claim 1, wherein the assembly is configured to enable integration with a metal T post or a wooden post of a fence.

3. An adaptable fence extension assembly, the assembly comprising:

an arc-shaped member, the arc-shaped member defined by a top end, a middle section, and a base end, the base end comprising a longitudinal slot, the longitudinal slot disposed along the length of the base end, the top end and the middle section of the arc-shaped member having a continuous longitudinal curvature, the arc-shaped member further defined by a concave side and a convex side, the concave side comprising at least one U-shaped cavity, the at least one U-shaped cavity defined by an inlet and a cavity terminus, the cavity terminus configured generally narrower than the inlet, the arc-shaped member further defined by an interior channel, the arc-shaped member configured to at least partially insulate electrical current;

at least one tine, the at least one tine disposed at the base end of the arc-shaped member, the at least one tine defined by at least one notch;

a spine, the spine disposed along the length of the interior channel of the arc-shaped member, the spine configured to enhance the structural integrity of the arc-shaped member; and a panel, the panel configured to detachably slide into the longitudinal slot, the panel defined by at least one aperture and a plurality of ribs, the plurality of ribs configured to enhance the structural integrity of the panel, the plurality of ribs further configured to help guide the panel into the slidable engagement with the longitudinal slot.

4. The assembly of claim 3, wherein the assembly is configured to enable integration with a metal T post or the wooden post of a fence.

5. The assembly of claim 3, wherein the base end of the arc-shaped member comprises an opening.

6. The assembly of claim 3, wherein the at least one U-shaped cavity is configured to enable reception of a cable, an electrical wire, or an electrical tape.

7. The assembly of claim 3, wherein the interior channel extends from the base end to the top end of the arc-shaped member.

8. The assembly of claim 3, wherein the spine is defined by a longitudinal portion and a plurality of latitudinal portions.

9. The assembly of claim 3, wherein the arc-shaped member is fabricated from an electrically insulated material.

10. The assembly of claim 3, wherein the arc-shaped member is fabricated from a high density polyurethane.

11. The assembly of claim 3, wherein the arc-shaped member is fabricated from an ultraviolet resistant material.

12. The assembly of claim 3, wherein the at least one tine and the at least one notch are configured to form a generally U-shape.

13. The assembly of claim 3, wherein the convex side of the arc-shaped member comprises a plurality of spaced-apart humps.

14. The assembly of claim 3, wherein the concave side of the arc-shaped member comprises multiple U-shaped cavities disposed in a spaced-apart configuration.

15. The assembly of claim 3, wherein the panel is defined by a narrow central region and two wide end regions.

16. The assembly of claim 3, wherein the at least one aperture of the panel comprises four apertures.

17. The assembly of claim 3, wherein the at least one aperture of the panel is configured to receive a fastener.

18. An adaptable fence extension assembly, the assembly comprising:

an arc-shaped member, the arc-shaped member defined by a top end, a middle section, and a base end, the base end comprising a longitudinal slot, the longitudinal slot disposed along the length of the base end, the top end and the middle section of the arc-shaped member having a continuous longitudinal curvature, the arc-shaped member further defined by a concave side inside the curvature and coextensive with the top end and the middle section and a convex side outside the curvature and coextensive with the top end and the middle section, the concave side comprising at least one U-shaped cavity, the at least one U-shaped cavity defined by an inlet and a cavity terminus, the cavity terminus configured generally narrower than the inlet, the arc-shaped member further defined by an interior channel, the interior channel longitudinally curved along its length, the arc-shaped member configured to at least partially insulate electrical current;

at least one tine, the at least one tine disposed at the base end of the arc-shaped member, the at least one tine defined by at least one notch;

a spine, the spine disposed along the length of the interior channel of the arc-shaped member, the spine configured to enhance the structural integrity of the arc-shaped member;

and a panel, the panel configured to detachably slide into the longitudinal slot, the panel defined by at least one aperture and a plurality of ribs, the plurality of ribs configured to enhance the structural integrity of the panel, the plurality of ribs further configured to help guide the panel into the slidable engagement with the longitudinal slot.

* * * * *